United States Patent Office 3,816,537
Patented June 11, 1974

3,816,537
PROCESS FOR THE ISOMERISATION OF NOPINONE
Giuliano Bozzato, Kusnacht, and Mario Pesaro, Zurich, Switzerland, assignors to Givaudan Corporation, Clifton, N.J.
No Drawing. Filed Nov. 26, 1971, Ser. No. 203,114
Claims priority, application Switzerland, Dec. 11, 1970, 18,382/70
Int. Cl. C07c 45/00
U.S. Cl. 260—586 R          4 Claims

ABSTRACT OF THE DISCLOSURE

There is disclosed a process for the formation of 4-isopropenyl - cyclohexanone and 4 - isopropylidene - cyclohexanone by the isomerisation of nopinone wherein nopinone is treated with an orthoformic acid lower alkyl ester in the presence of an acidic catalyst and the reaction product is subjected to acidic hydrolysis.

DESCRIPTION OF THE PRIOR ART

Methods for the isomerisation of nopinone by opening of its cyclobutane ring are known. Treatment with sulphuric acid under reflux (see, for example, Aust. J. Chem., 21 (1968), 2467–72) or thermal isomerisation (see, for example, J. Org. Chem., 35 (1970), 2688–2690) have been disclosed. These methods however, are unsuitable for the production of the particularly desired 4-isopropenyl-cyclohexanone on a technical scale, since they give this ketone in insufficient yield (5 or 30%).

SUMMARY OF THE INVENTION

Nopinone used as the starting material is readily obtainable from β-pinene by oxidation (J. Am. Chem. Soc., 77, 3054 (1955); J. Am. Chem. Soc., 82, 5445 (1960); Liebigs Ann. Chem., 625, 12 (1959)).

The isomerisation reaction, wherein nopinone is treated with an alkyl orthoformic ester in the presence of an acid catalyst, followed by acid hydrolysis in accordance with the invention, can be illustrated by the following scheme:

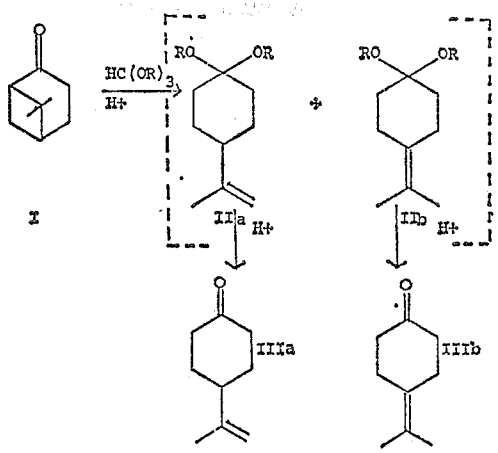

Intermediates (IIa) and (IIb), wherein R is alkyl, are probably formed but are not purified or characterized and we do not wish to be limited to the postulation of this reaction pathway.

The mixture of the ketones (IIIa) and (IIIb) obtained from nopinone (I) can be employed as such as the starting material for further syntheses or the two isomers (IIIa) and (IIIb) can be separated according to methods of separation which are known per se (e.g. by fractional distillation) and then used in practically pure form. 4-Isopropenylcyclohexanone (IIIa) is used as intermediate for the synthesis of nootkatone (see Pesaro et al., Chem. Comm., 1152–1154 (1968)). 4-Isopropylidene-cyclohexanone (IIIb) is used as starting material for the synthesis of the noreremophilanes of examples 3, 5 and 6 of Belgian Pat. 763168.

The process of the present invention represents a simple productive route for the conversion of nopinone into 4-isopropenyl-cyclohexanone. The yield of the desired isomerisation products (4-isopropenyl)- and (4-isopropylidenecyclohexanone) amounts to up to 80% of the theory, the proportion of 4-isopropenylcyclohexanone to 4-isopropylidene-cyclohexanone amounting to at least 2:1.

DESCRIPTION OF THE PREFERRED EMBODIMENTS

Nopinone is treated with an orthoformic acid lower alkyl ester, suitably a lower alkyl ester with up to 4 C-atoms in the alkyl group, preferably methyl orthoformate is used.

Any strong acid may be used as the acidic catalyst. Inorganic acids such as anhydrous phosphoric acid, or concentrated sulfuric acid are used, as well as strong organic acids, for example p-toluenesulphonic acid. The amount of catalyst in general amounts to about 1–10 g. per mol of nopinone, when using the preferred sulphuric acid preferably about 2 g. per mol of nopinone is employed.

The addition of a solvent is unnecessary for the reaction of nopinone with the orthoformic acid alkyl ester. However, this reaction may also be carried out using solvents such as aromatic and saturated aliphatic hydrocarbons, for example benzene, toluene, pentane, hexane etc., as well as esters such as acetic acid methyl ester, or with ether.

The reaction may be carried out at temperatures of between about 0° C. to about 100° C. for from about 3 hours to about 20 minutes respectively, reaction at ambient temperature being preferred.

The acid hydrolysis of the reaction product can be undertaken according to methods which are known per se, for example with dilute mineral acids in organic solvents. As mineral acids there may be mentioned: aqueous hydrochloric acid, nitric acid, phosphoric acid and, preferably, sulphuric acid, expediently about 2 N sulphuric acid. As the solvents there come into consideration: water-miscible ethers and ketones such as tetrahydrofuran, dioxan, ethyl methyl ketone or, preferably, acetone.

The hydrolysis reaction temperature can lie between wide limits, for example between about 0 and 100° C. However, the reaction can advantageously be effected at room temperature, i.e. at about 20 °C.

In the following examples, the temperatures are stated in degrees centigrade.

EXAMPLE 1

(a) Manufacture of 4-isopropenyl-cyclohexanone and 4-isopropylidene-cyclohexanone: 138 g. (1.0 mol) of nopinone were treated with stirring at 20° with 117 g. (1.1 mol) of orthoformic acid methyl ester and 1 ml. (1.85 g.) of conc. sulphuric acid. The reaction mixture was stirred at 20° for about 2 hours 30 minutes. After the addition of 1000 ml. of acetone, 360 ml. of water and 3.5 ml. of 2 N sulphuric acid, the mixture was stirred for a further 2 hours and then neutralized with a solution of 2.3 g. of anhydrous sodium carbonate in 5 ml. of water. For the working up, the solvent was evaporated on the rotary evaporator until the formation of two phases. The organic phase was separated off and the aqueous phase shaken out 3 times with ether. The pooled organic phases were then washed with a saturated sodium chloride solution, dried with magnesium sulphate and evaporated. There were obtained 135 g. of a crude product which was distilled on a Vigreux column. The fraction (114 g.) with B.P. at 98–108°/11 Torr is the mixture of 4-isopropenylcyclohexanone (proportion in the mixture 70%) and 4-isopropylidene-cyclohexanone (proportion in the mixture 30%).

The preparative gas-chromatographic resolution of the mixture yielded 4-isopropenyl-cyclohexanone with B.P. at 85–87°/8 Torr, $n_D^{20}$=1.4751; IR spectrum (CCl$_4$) bands at 1720, 1645 and 900 cm.$^{-1}$; NMR spectrum: (CDCl$_3$) δ: 1.78 p.p.m. (S, 3H); 4.81 p.p.m., (S, 2H); and 4-isopropylidene-cyclohexanone with B.P. at 102°/10 Torr $n_D^{20}$=1.4891; IR spectrum (liq.): bands at 1720 cm.$^{-1}$; NMR spectrum: (CDCl$_3$) δ=1.74 p.p.m. (S, 6H).

From the distillation residue (17 g.), by a further distillation there could be isolated 5.6 g. of 4-[2-methoxy-2-propyl]-cyclohexanone with B.P. 121–123°/11 Torr.

(b) Isolation of 4-isopropenyl-cyclohexanone: 228 g. of the mixture of 4-isopropenyl-cyclohexanone (70%) and 4-isopropylidene-cyclohexanone (30%) were distilled on a packed column (50 cm.). The fraction (135 g.) with B.P. 83–90°/11 Torr was the mixture of 4-isopropenyl-cyclohexanone (85%) and 4-isopropylidene-cyclohexanone (15%). The further fractionation of this mixture on the same column yielded 91 g. of 4-isopropenyl-cyclohexanone (95%) with B.P. 83–87°/11 Torr, $n_D^{20}$=1.4755 and spectral data in agreement with an authentic sample of this ketone.

The percentage composition of the mixtures given above was determined gas-chromatographically.

EXAMPLE 2

By isomerisation of 13.8 g. of nopinone according to the process of Example 1, but using orthoformic acid ethyl ester, there was obtained a product which after distillation (87–99°/11 Torr; 7.3 g.) consisted of 4-isopropenyl-cyclohexanone to the extent of 77% and of 4-isopropylidene-cyclohexanone to the extent of 23%.

EXAMPLE 3

By isomerisation of 6.9 g. of nopinone according to the process of Example 1, but using orthoformic acid butyl ester, there was obtained a product which after distillation (90–92°/11 Torr; 3.8 g.) consisted of 4-isopropenyl-cyclohexanone to the extent of 84% and of 4-isopropylidene-cyclohexanone to the extent of 16%.

EXAMPLE 4

By isomerisation of 13.8 g. of nopinone according to the process of Example 1, but using 500 mg. of p-toluenesulphonic acid instead of conc. sulphuric acid, there was obtained a product which after distillation (89–92°/11 Torr; 9.2 g.) consisted of 4-isopropenyl-cyclohexanone to the extent of 76% and of 4-isopropylidene-cyclohexanone to the extent of 24%.

EXAMPLE 5

13.8 g. of nopinone are treated with stirring at 20° with 11.5 g. of orthoformic acid methyl ester and 0.1 ml. of conc. sulphuric acid. The mixture was boiled at reflux (100°) for 20 min. and then, after cooling to 20°, worked up as described in Example 1. The product obtained after distillation (92–93°/11 Torr; 8.4 g.) consisted of 4-isopropenyl-cyclohexanone to the extent of 80% of 4-isopropylidene-cyclohexanone to the extent of 20%.

What is claimed is:

1. Process for the formation of a mixture of 4-isopropenyl-cyclohexanone and 4-isopropylidene-cyclohexanone, which comprises treating nopinone with an orthoformic acid lower alkyl ester in the presence of a strong acid catalyst selected from the group consisting of anhydrous phosphoric acid, concentrated sulfuric acid and p-toluenesulfonic acid and subjecting the reaction products to acid hydrolysis with dilute mineral acid in the presence of water-miscible ethers or ketones selected from the group consisting of tetrahydrofuran, dioxan, methyl ethyl ketone and acetone, both steps being conducted within the range from about 0° C. to 100° C.

2. Process according to claim 1, characterised in that orthoformic acid methyl ester is used as the ester.

3. Process according to claim 2, characterised in that concentrated sulphuric acid is used as the acidic catalyst.

4. Process according to claim 1, comprising the additional step of isolating 4-isopropenyl-cyclohexanone from the ketone mixture obtained by fractional distillation.

References Cited

Lewis et al.: "Aust. J. Chem.," vol. 21, pp. 2467–72 (1968).

LEON ZITVER, Primary Examiner

N. MORGENSTERN, Assistant Examiner